United States Patent [19]

Krantz

[11] Patent Number: 5,482,995
[45] Date of Patent: Jan. 9, 1996

[54] GRAFTED BLOCK COPOLYMERS, PROCESS FOR THEIR MANUFACTURE AND USE OF THESE COPOLYMERS

[75] Inventor: Nicolas Krantz, Bernay, France

[73] Assignee: Elf Atochem S.A., France

[21] Appl. No.: 369,863

[22] Filed: Jan. 5, 1995

Related U.S. Application Data

[63] Continuation of Ser. No. 173,701, Dec. 27, 1993, abandoned, which is a continuation of Ser. No. 424,351, Oct. 19, 1989, abandoned.

[51] Int. Cl.$^6$ .................... C08F 283/02; C08F 283/04; C08F 283/06
[52] U.S. Cl. .................... 525/41; 525/42; 525/404; 525/412; 525/426; 525/445
[58] Field of Search .................... 525/41, 42, 404, 525/412, 426, 445

[56] References Cited

U.S. PATENT DOCUMENTS

| | | | |
|---|---|---|---|
| 3,823,201 | 7/1974 | Pizzini | 524/377 |
| 3,960,572 | 6/1976 | Ibata | 525/445 |
| 3,963,803 | 6/1976 | Tanaka | 525/445 |
| 4,100,127 | 7/1978 | Fukusaki | 525/42 |
| 4,464,456 | 8/1984 | Fujikawa | 522/104 |

FOREIGN PATENT DOCUMENTS

| | | | |
|---|---|---|---|
| 011523 | 1/1985 | Japan | 525/445 |
| 063837 | 4/1986 | Japan | 525/426 |

*Primary Examiner*—David Buttner
*Attorney, Agent, or Firm*—Pennie & Edmonds

[57] ABSTRACT

A grafted block copolymer having a backbone and grafts produced by monomers, the backbone consisting of sequentially distributed units wherein at least one block of the backbone is soluble in the monomer composition from which the grafts are produced and in that at-least one block of the said backbone is insoluble in the said monomer composition and the process of making such grafted block copolymer by radical grafting and radical polymerization of a monomer on the backbone are preformed.

8 Claims, No Drawings

GRAFTED BLOCK COPOLYMERS, PROCESS FOR THEIR MANUFACTURE AND USE OF THESE COPOLYMERS

This is a continuation of application Ser. No. 08/173,701, filed Dec. 27, 1993, now abandoned, which is a continuation of application Ser. No. 07/424,351 filed Oct. 19, 1989, abandoned.

BACKGROUND OF THE INVENTION

The present invention relates to novel grafted block copolymers: polymers called grafts are grafted onto backbone polymers called, more simply, backbones, the process for making them, and the use thereof.

The Japanese patent published under number 63—41,558 describes the synthesis of a flexible thermoplastic resin prepared by polymerization in an aqueous medium of a monomer mixture based on vinylchloride in the presence of a monomer-soluble thermoplastic polyurethane.

SUMMARY OF THE INVENTION

The subject of the invention is, firstly, novel grafted block copolymers whose backbones consist of sequentially distributed units and which are characterized in that at least one block of the backbone is soluble in the monomer composition from which the grafts are derived, and in that at least one block of the said backbone is insoluble in the said monomer composition.

The invention also comprises the method of making such copolymers and products utilizing the same as hereinafter set forth.

DETAILED DESCRIPTION

The monomer composition producing the grafts in accordance with the invention may consist of either liquid or gaseous monomers, this distinction being of no consequence, which contain at least one ethylenic unsaturation.

Examples which may be mentioned are liquid or gaseous monomers containing at least one halogenated or unhalogenated olefinic, vinyl, acrylic or methacrylic functional group.

The preferred monomers are vinyl and vinylidene chlorides, chlorotrifluoroethylene, methyl, ethyl, butyl and 2-ethylhexyl (meth)acrylates, styrene, α-methylstyrene and vinyl acetate, it being possible for the abovementioned monomers to be employed in a mixture.

Among the preferred mixtures, those most particularly mentioned will be ones which, in addition to vinyl chloride, contain an alkyl (meth)acrylate (and optionally vinylidene chloride), or vinyl acetate or chlorotrifluoroethylene, as well as mixtures based on styrene and an alkyl (meth)acrylate.

The polymers which form the backbones of the grafted block copolymers according to the invention are such that at least one block of which they consist is soluble in the monomer composition such as defined above and at least one block is insoluble in the said monomer composition.

Block copolymers based on polyester or on polyamide may be mentioned by way of examples of block copolymers capable of forming the backbones of grafted block copolymers in accordance with the invention. In general, these block copolymers belong to the class of thermoplastic elastomers (TPE); they exhibit a sequential distribution of constituent units of rigid blocks and of flexible blocks.

Among these block copolymers, there will be mentioned in particular:

(i) Polyester-based block copolymers in which the rigid phase consists of polyester sequences made up, for example, of polybutylene or polyethylene terephthalate, these sequences being copolymerized with flexible sequences made up, for example, of a glycol of low molecular weight in combination with a poly(alkylene ether) glycol, and (ii) Block copolymers based on polyamide in the case of the rigid sequences and on polyether flexible sequences, which are also called polyetheramides.

These block polyetheramides can result, in particular, from the copolycondensation of polyamide sequences containing reactive ends with polyether sequences containing reactive ends, such as, among others:

(a) Polyamide sequences containing diamine chain ends with polyoxyalkylene sequences containing dicarboxylic chain ends, (b) Polyamide sequences containing dicarboxylic chain ends with polyoxyalkylene sequences containing diamine chain ends, obtained by cyanoethylation and hydrogenation of aliphatic alpha, omega-dihydroxylated polyoxyalkylene sequences, called polyetherdiols, or (c) Polyamide sequences containing dicarboxylic chain ends with polyetherdiols, the polyetheramides obtained being, in this particular case, polyetheresteramides, which are particularly preferred.

Such products have been described, for example, in French Patents No. 74/18,913 and 77/26,678, the contents of which are incorporated by reference into the present description.

The number-average molecular mass of these polyamide sequences is generally between 500 and 10,000 and more particularly between 600 and 5,000. The polyamide sequences of the polyetheresteramides preferably consist of polyamide 6, 66, 612, 11 or 12, or of copolyamides resulting from the polycondensation of their monomers.

The number-average molecular mass of the polyethers is generally between 200 and 6,000 and more particularly between 600 and 3,000.

The polyether sequences preferably consist of polytetramethylene glycol (PTMG), polypropylene glycol (PPG) or polyethylene glycol (PEG).

The inherent viscosity of the polyetheresteramides is advantagenously between 0.8 and 2.05.

The inherent viscosity is measured in meta-cresol at 20° C. with an initial concentration of 0.5 g per 100 g of meta-cresol.

The polyetheresteramides according to the invention may consist of 5 to 85% by weight of polyether and of 95 to 15% by weight of polyamide, and preferably of 30 to 80% by weight of polyether and of 70 to 20% by weight of polyamide.

The invention also relates to the process for the manufacture of these grafted block copolymers. They are prepared by radical grafting of a monomer composition such as defined above onto the macromolecular chains which form the backbones and by polymerization of the said monomer composition in order to produce the grafted block polymers according to the invention.

The said monomer composition not only begins to graft onto the backbones via a radical mechanism, but it also polymerizes via a radical mechanism so that graft polymers, or grafts, are formed.

A radical polymerization is understood to mean, in the present description, a polymerization in the presence of a polymerization initiator which generates free radicals.

The polymerization methods which are usually employed are suitable for the synthesis of grafted block copolymers according to the invention.

Bulk polymerization and suspension polymerization may be mentioned.

In general, the polymerization/grafting temperature is between 30° to 100° C., and preferably between 35° and 80° C.

The polymerization initiators are generally organo-soluble compounds. They may be chosen from the organo-soluble polymerization initiators which are usually employed in suspension polymerization, such as organic peroxides like lauroyl peroxide, benzoyl peroxide, acetyl cyclohexanesulphonyl peroxide, isobutyryl peroxide, dichloroacetyl peroxide and trichloroacetyl peroxide, peroxydicarbonates like ethyl peroxydicarbonate, ethylhexyl peroxydicarbonate, isopropyl peroxydicarbonate, isobutyl peroxydicarbonate, and dicetyl peroxydicarbonate, tert-butyl methoxyperacetate, tert-butyl ethoxyperacetate and tert-butyl 2-phenoxyperpropionate. 0.001 to 0.10% by weight, based on the monomers employed, of the initiator or of the initiators is generally employed, expressed as active oxygen.

In the suspension polymerization process, the reaction mixture employed comprises water, the backbone polymers and a monomer composition such as defined above, optionally a stabilizing agent and at least one organosoluble polymerization initiator such as defined above.

The stabilizing agent may be chosen from those usually employed in suspension polymerization, such as, for example, polyvinyl alcohol, methyl celluloses, carboxy celluloses and gelatins.

The quantity of stabilizing agent employed is generally between 0.05 to 1% of the weight of the monomer composition and of the backbone polymers which are introduced.

The quantity of water used is chosen to be such that the initial content of monomer composition and of backbone polymers is generally between 30 and 80% of the weight of the total reaction mixture.

The backbone polymers are introduced into the reaction mixture in powder form (with a mean particle size which is generally between 20 to 200 μm) or in granular form (with a mean particle size which is generally between 200 μm and 5 mm, and preferably between 500 μm and 4 mm).

When the backbone polymers are introduced in granular form into the reaction mixture, the presence of a stabilizing agent during the polymerization is optional.

On the other hand, after polymerization, formulation adjuvants may be added, such as a heat stabilizer, lubricant, antioxidant, pigment, etc.

The monomer composition may be introduced into the reaction mixture only once at the beginning of the reaction, but may also be introduced continuously throughout the duration of the suspension polymerization.

Once the polymerization/grafting is finished, the grafted block copolymers may be isolated from the reaction mixture by any known processes, such as filtration, draining or centrifugal separation, and may be dried and possibly screened or ground.

In the bulk polymerization process, the reaction mixture comprises the backbone polymers, a monomer composition and at least one radical polymerization initiator.

The operation is carried out in a reactor in which the stirring must be sufficient to ensure a good homogeneity of the reaction of polymerization/grafting onto the granules of backbone polymers.

The degree of grafting of the monomer composition onto the backbone polymers can be measured by selective extraction.

For example, to measure the degree of grafting of a monomer composition onto backbone polymers based on polyetheresteramides, a selective extraction of the products resulting from the polymerization/grafting reaction such as described above is first of all carried out in isopropanol or hexafluoroisopropanol.

Only the poyetheresteramide (which forms the backbone polymers) is soluble in alcohols; the grafted block copolymers, as well as the polymers derived exclusively from the monomer composition introduced, are insoluble. The quantity of backbone polymers based on poyetheresteramide which have not been grafted by the monomer composition can thus be determined.

In a second step, and in order to determine the quantity of polymers derived exclusively from the monomer composition, that is to say those not grafted onto the backbone polymers, the products obtained are dissolved in tetrahydrofuran (THF); isopropanol or hexafluoroisopropanol is then added in order to precipitate selectively the polymers derived exclusively from the monomer composition.

A further subject of the invention is the use of these grafted block copolymers for the manufacture of molded or extruded articles.

In the case where the monomer composition contains vinyl chloride, the copolymers obtained must be formulated. For example, adjuvants and additives usually encountered in the formulation of PVC or of its copolymers may be employed, such as a heat stabilizer, lubricating agent, fillers, etc.

Tin and barium/cadmium salts may be mentioned as examples of a heat stabilizer. Polyethylene waxes may be mentioned as examples of a lubricating agent.

In the case where the backbone polymers are introduced in granular form, the formulation adjuvants are added after the polymerization/grafting and before the degassing of the monomer composition, this being in order to enable the adjuvants to migrate right into the core of the granules.

The grafted copolymers according to the invention can be converted into molded objects by the usual injection or compression methods or into tubes, films, extruded cable coatings and molded articles using calendering, extrusion and blow-extrusion methods.

The invention also relates to the use of these grafted block copolymers as an emulsifying agent for polymers which are incompatible with each other but at least one of which is compatible with the backbone polymers and one at least is compatible with the monomer composition from which the grafts are produced.

The grafted block copolymer may be incorporated in the usual manner into the mixture of thermoplastic resins, in the molten state, in a kneading device. The quantity of copolymer which is introduced may be between 1 to 30%, and preferably between 2 and 15% by weight relative to the weight of the thermoplastic resin mixture.

Polyvinyl chloride (PVC) and copolymers or mixtures containing vinyl chloride (VCM) may be mentioned in particular as examples of thermoplastic polymers or resins which are compatible with the polymers resulting from a monomer composition containing vinyl chloride.

The invention will be further described in connection with the following examples which are set forth for purposes of illustration only.

EXAMPLE 1

150 g of granules of polyetheresteramide with a mean particle size equal to approximately 3 mm are introduced into a 2 liter reactor.

The polyetheresteramide employed is obtained by copolycondensation of α,ω-dicarboxylated polyamide 12 blocks of $\overline{Mn}=600$ with α,ω-dihydroxylated polytetramethylene glycol blocks of $\overline{Mn}=2,000$.

After a hard vacuum has been applied for 5 minutes, 45 g of butyl acrylate and 3 g of polymerization initiator are added.

After 2 hours' gentle stirring of the reaction mixture at ambient temperature, 800 g of water are added and the reaction mixture is heated to 56° C.

The polymerization takes place at 56° C. for 6 hours. When the polymerization is finished, the unreacted monomers, that is those neither grafted nor polymerized, are removed from the monomer composition.

The copolymers obtained are next filtered off and are then dried under vacuum. 182 g of resin granules are obtained, and are converted into test specimens by being put through an injection press.

The test specimens are evaluated in respect of traction and elongation in accordance with NF Standard T 51 034 an in respect of Shore D hardness in accordance with ISO Standard 868 and the results are set forth in Table I.

EXAMPLE 2

150 g of polyetheresteramide granules with a mean particle size equal to approximately 3 mm and characteristics identical with those described in Example 1 are introduced into a 2 liter reactor.

After a hard vacuum has been applied for 5 minutes, 45 g of methyl methacrylate and 3 g of polymerization initiator are added.

The polymerization/grafting, filtration and drying conditions are identical with those described in Example 1. 186 g of granules are obtained and are injection molded in the form of test specimens, which are evaluated under the same conditions as in Example 1 and the results are set forth in Table I.

EXAMPLE 3

A. 1,600 g of polyetheresteramide powder with a mean particle size equal to 40 μm are dispersed in 13 kg of water containing 18 g of stabilizing agent (a colloid of the polyvinyl alcohol type) in a 25 liter reactor.

The polyetheresteramide has the same characteristics as that employed in Example 1.

A hard vacuum is applied for 5 minutes before introducing 5,400 g of VCM and 32 g of polymerization initiator. The reactor is fitted with a Pfaudler stirrer and a counterblade, and the stirring speed is 300 revolutions/min.

The reaction mixture is first stirred at ambient temperature for 2 hours and is then heated under autogenous pressure at 60° C. for 6 hours.

The reactor is then degassed to remove the unconverted monomer (s).

The graft copolymers are next isolated and then formulated with the formulation adjuvants.

Sheets are obtained by calendering and are pressed into the form of plaques from which test specimens are cut with a punch cutter so that they may be evaluated in the same way as in Example 1.

The results are set forth in Table I.

B. By way of comparison, 350 g of polyetheresteramide powder of the same characteristics as in A are mixed on a roll mill with 650 g of PVC with a viscosity index VI=110, 10 g of heat stabilizer and 0.3 g of lubricating agent for 5 minutes at a temperature of 170° C.

Sheets are obtained at the mill exit and are pressed into the form of plaques 150×150×2 and 150 ×150×4 mm in size for 5 minutes at 200° C., from which test specimens are cut using a punch cutter and evaluated as in A and the results are set forth in Table I.

EXAMPLE 4

A. 150 g of polyetheresteramide powder are dispersed in 100 g of water containing 1.7 g of stabilizing agent (a colloid of the polyvinyl alcohol type) in a 2 liter reactor.

A hard vacuum is applied for 5 minutes before adding 280 g of VCM and 3 g of polymerization initiator.

After a period of 2 hours at 25° C. with gentle stirring (50 rev/min), 900 g of water are added. The polymerization takes place at 60° C. for 6 hours with stirring. 4 g of heat stabilizer, 0.9 g of lubricant and 100 g of VCM are then added. The reaction mixture is stirred for 1 hour at 30° C. before the unconverted VCM is stripped off.

The copolymers obtained are next filtered off and then dried under vacuum. 370 g of powder are obtained.

The conditions for converting the grafted block polymers into plaques and the conditions of evaluation of the test specimen are identical with those in Example 3.

B. 420 g of polyetheresteramide powder, 580 g of PVC of VI=110, 10 g of heat stabilizer and 0.3 g of lubricating agent are mixed for 5 minutes at a temperature of 170° C.

The polyetheresteramide employed in A and B has the same characteristics as that described in Example 1. The test specimens are evaluated using the same tests as those described in Example 1.

The results obtained are listed in Table I.

EXAMPLE 5

A. 2,250 g of polyetheresteramide granules with a mean particle size equal to approximately 3 mm are introduced into a 25 liter reactor. After a hard vacuum has been applied for 5 minutes, 3,150 g of VCM and 45 g of polymerization initiator are added.

The polyetheresteramide has the same characteristics as that employed in Example 1.

After 2 hours' gentle stirring of the reaction mixture at ambient temperature, 9 kg of water are added. The reaction mixture is heated to 60° C. and stirred for 6 hours. 200 g of heat stabilizer, 13 g of lubricating agent and 1 kg of VCM are then added. After one hour at 30° C. the reaction mixture is degassed in order to remove the unconverted monomer(s). The graft copolymers are next isolated and are then dried under vacuum. 4,300 g of granules are obtained and are converted into plaques from which test specimens are cut in the same way as in Example 3. The test specimens are then evaluated using the same tests as those described in Example 3.

The results obtained in A are set forth in Table I.

B. 530 g of polyetheresteramide with the same characteristics and particle size as in Example 3 are mixed on a roll mill with 470 g of PVC of VI=110, 10 g of heat stabilizer and 0.3 g of lubricating agent for 5 minutes at a temperature of 170° C.

Sheets are obtained and are pressed for 5minutes at 200° C. into the form of plaques from which test specimens are cut and are evaluated as in A.

The results are set forth in Table I.

EXAMPLE 6

100 g of polyetheresteramide powder with the same characteristics and particle size as that described in Example 3 are introduced into a 1 liter reactor of the post-polymerizer type, and a hard vacuum is then applied for 15 minutes.

600 g of VCM an 1.5 g of polymerization initiator are then added.

The pulverulent mixture is allowed to swell for 30 minutes at rest and at ambient temperature and the reactor is then heated to 60° C. for 7 hours to allow the polymerization/ grafting to take place with stirring at 100 revolutions/min.

The graft copolymers obtained (430 ) are formulated with a heat stabilizer (tin salt) and a lubricant (polyethylene wax), and are calendered into the form of sheets which are pressed into the form of plaques from which test specimens are cut and are tested under the same conditions as those in Example 3.

The results obtained are set forth in Table I.

EXAMPLE 7

2,500 g of polyetheresteramide granules with a mean particle size equal to approximately 3 mm are introduced into a 25 liter reactor.

The polyetheresteramide is obtained by copolycondensation of α,ω-dicarboxylated polyamide 12 blocks of $\overline{Mn}$=2,000 with polytetramethylene glycol blocks of $\overline{Mn}$ =2,000.

After a hard vacuum has been applied for 5 minutes, 2,500 g of VCM and 25 g of polymerization initiator are added. After 2 hours' gentle stirring of the reaction mixture at ambient temperature, 5 kg of water are added. The reaction mixture is heated to 56° C. for 6 hours and then cooled to 30° C.

1 kg of VCM, 200 g of heat stabilizers and 12.5 g of lubricating agents are then added.

The whole is heated to 35° C. for 2 hours and the unreacted VCM is then stripped off.

After filtration and drying, 4,300 g of granules are obtained and are converted into plaques from which test specimens are cut and evaluated in the same way as in Example 3.

The results are set forth in Table I.

EXAMPLE 8

150 g of polyetheresteramide granules with a mean particle size equal to approximately 3 mm and with characteristics identical with those described in Example 1 are introduced into a 2 liter reactor.

After a hard vacuum has been applied for 5 minutes, 200 g of VCM, 20 g of vinyl acetate and 3 g of polymerization initiator are added.

After 2 hours' gentle stirring of the reaction mixture at ambient temperature, 800 g of water are added. The reaction mixture is heated to 6° C. and stirred for 6 hours. 10 g of heat stabilizer, 1 g of lubricating agent and 100 g of VCM are then added. After on hour at 30° C., the reaction mixture is degassed to remove the unconverted monomers. The graft copolymers are next isolated and are then dried under vacuum. 310 g of granules are obtained and are converted into plaques from which test specimens are cut in the same way as in Example 3. The test specimens are then evaluated using the same tests as those described in Example 3.

The results are set forth in Table I.

EXAMPLE 9

150 g of polyetheresteramide granules with a mean particle size equal to approximately 3 mm and with characteristics identical with those described in Example 1 are introduced into a 2 liter reactor.

After a hard vacuum has been applied for 5 minutes, 45 g of styrene and 3 g of polymerization initiator are added.

The polymerization/grafting, filtration and drying conditions are identical with those described in Example 1. 182 g of granules are obtained and are injection molded into the form of test specimens, which are evaluated under the same conditions as in Example 1.

The results are set forth in Table I.

EXAMPLE 10

150 g of polyetheresteramide granules with a mean particle size equal to approximately 3 mm and with characteristics identical with those described in Example 1 are introduced into a 2 liter reactor.

After a hard vacuum has been applied for 5 minutes, 150 g of styrene and 3 g of polymerization initiator are added.

The polymerization/grafting, filtration and drying conditions are identical with those described in Example 1. 300 g of granules are obtained and are injection molded into the form of test specimens, which are evaluated under the same conditions as in Example 1.

The results are set forth in Table I.

EXAMPLE 11

150 g of polyetheresteramide granules with mean particle size equal to approximately 3 mm and with characteristics identical with those described in Example 1 are introduced into a 2 liter reactor.

After a hard vacuum has been applied for 5 minutes, 160 g of 2-ethylhexyl acrylate and 3 g of polymerization initiator are added.

The polymerization/grafting, filtration and drying conditions are identical with those described in Example 1. 300 g of granules are obtained and are injection molded into the form of test specimens, which are evaluated under the same conditions as in Example 1.

The results are set forth in Table I.

EXAMPLE 12

150 g of polyetheresteramide granules with a mean particle size equal to approximately 3 mm and with characteristics identical with those described in Example 1 are introduced into a 2 liter reactor.

After a hard vacuum has been applied for 5 minutes, 150 g of chlorotrifluoroethylene and 2 g of polymerization initiator are added.

The polymerization/grafting, filtration and drying conditions are identical with those described in Example 1. 255 g of granules are obtained and are injection molded into the form of test specimens, which are evaluated under the same conditions as in Example 1.

The results are set forth in Table I.

EXAMPLE 13

150 g of polyetherester granules with a mean particle size equal to approximately 3 mm are introduced into a 2 liter reactor. The polyetherester employed results from the copolymerization of polytetramethylene glycol blocks of $\overline{Mn}=2,000$ with polyester blocks consisting of polybutylene terephthalate. Its shore D hardness is equal to 35.

After a hard vacuum has been applied for 5 minutes, 45 g of butyl acrylate and 3 g of polymerization initiator are added.

The polymerization/grafting, filtration and drying conditions are identical with those described in Example 1. 188 g of granules are obtained and are injection molded into the form of test specimens, which are evaluated under the same conditions as in Example 1.

The results are set forth in Table I.

EXAMPLE 14

150 g of polyetherester granules with a mean particle size equal to approximately 3 mm and with characteristics identical with those described in Example 13 are introduced into a 2 liter reactor.

After a hard vacuum has been applied for 5 minutes, 45 g of methyl methacrylate and 3 g of polymerization initiator are added.

The polymerization/grafting, filtration and drying conditions are identical with those described in Example 1. 189 g of granules are obtained and are injection molded into the form of test specimens, which are evaluated under the same conditions as in Example 1.

The results are set forth in Table I.

EXAMPLE 15

150 g of polyetherester granules with a mean particle size equal to approximately 3 mm an with characteristics identical with those described in Example 13 are introduced into a 2 liter reactor.

After a hard vacuum has been applied for 5 minutes, 200 g of VCM and 3 g of polymerization initiator are added.

The polymerization/grafting conditions are identical with those described in Example 8. Before, stripping off the unconverted VCM, 10 g of heat stabilizer (tin salt) and 1 g of lubricant (polyethylene wax) are added.

186 g of granules are obtained and are injected molded into the form of test specimens, which are evaluated under the same conditions as in Example 1.

The results are set forth in Table I.

EXAMPLE 16

150 g of polyetherester granules with a mean particle size equal to approximately 3 mm and with characteristics identical with those described in Example 13 are introduced into a 2 liter reactor.

After a hard vacuum has been applied for 5 minutes, 45 g of styrene and 3 g of polymerization initiator are added.

The polymerization/grafting, filtration and, drying conditions are identical with those described in Example 1.

183 g of granules are obtained and are injection molded into the form of test specimens, which are evaluated under the same conditions as in Example 1.

The results are set forth in Table I.

EXAMPLE 17 (COMPARATIVE)

A. Plaques of two kinds of polyetheresteramide are molded, one with the same characteristics as that employed in Example 1 (sample A1), the other with the same characteristics as that employed in Example 7 (sample A2).

B. Plaques of PVC plasticized with diisoocytyl phthalate are molded (plasticized with 40 phr sample B1)

(plasticized with 60 phr sample B2)

(plasticized with 100 phr sample B3)
(phr means per 100 grams of resin).

C. polyetherester plaques are molded (the former having the same characteristics as that described in Example 13).

Test specimens are cut from the plaques obtained in A, B and C and are tested under conditions identical with those described in Example 1.

The test results are set forth in Table I.

TABLE I

| Ex. No. | Backbone * Grafted base | Degree of grafting in (%) | Backbones (% by weight) in the mixture) | Shore D hardness (instantaneous) | Tensile BS (MPa) | EB (%) |
|---|---|---|---|---|---|---|
| 1 S | Polyetherester-amide * Butyl acrylate | 48 | 82 | 17 | 9 | 380 |
| 2 S | Polyetherester-amide * Methyl methacrylate | 78 | 80 | 24 | 15 | 380 |
| 3A S | Polyetherester-amide * VCM | 80 | 35 | 51 | 21 | 302 |
| 3B | Polyetherester-amide + PVC | mixture | 35 (not grafted) | 49 | 11 | 22 |
| 4A | Polyetherester- | 90 | 40 | 46 | 19 | 448 |

TABLE I-continued

| Ex. No. | Backbone * Grafted base | Degree of grafting in (%) | Backbones (% by weight) in the mixture | Shore D hardness (instantaneous) | Tensile BS (MPa) | Tensile EB (%) |
|---|---|---|---|---|---|---|
| | amide + VCM | | | | | |
| 4B | Polyetherester-amide + PVC | mixture | 40 (not grafted) | 50 | 10 | 33 |
| 5A S | Polyetherester-amide * | 85 | 53 | 34 | 16 | 509 |
| | VCM | | | | | |
| 5B | Polyetherester-amide + PVC | mixture | 53 (not grafted) | 38 | 6 | 62 |
| 6 B | Polyetherester-amide * | 90 | 23 | | | |
| | VCM | | | | | |
| 7 S | Polyetherester-amide * | 70 | 58 | | | |
| | VCM | | | | | |
| 8 S | Polyetherester-amide * | 85 | 48 | | | |
| | VCM, vinyl acetate | | | | | |
| 9 S | Polyetherester-amide * | 19 | 82 | 20 | 17 | 740 |
| | styrene | | | | | |
| 10 S | Polyetherester-amide * | 60 | 50 | 40 | 16 | 70 |
| | styrene | | | | | |
| 11 S | Polyetherester-amide * | 50 | 50 | 24 | 2 | 260 |
| | 2-ethyl-hexyl acrylate | | | | | |
| 12 S | Polyetherester-amide * | 80 | 66 | | | |
| | chlorotri fluoroethylene | | | | | |
| 13 S | Polyetherester * | | 78 | 22 | 6 | 96 |
| | butyl acrylate | | | | | |
| 14 S | Polyetherester * | | 80 | 36 | 15 | 130 |
| | butyl methacrylate | | | | | |
| 15 S | Polyetherester * | | 54 | 40 | 12 | 104 |
| | VCM | | | | | |
| 16 S | Polyetherester * | | 82 | | | |
| | styrene | | | | | |
| 17A | Polyetherester-amide | | | 24 | 24 | 1159 |
| 17 A₂ | Polyetherester-amide | backbones alone | 100 | 46 | 47 | 855 |
| 17 B₁ | PVC | grafts alone | 0 | 58 | 23 | 267 |
| 17 B₂ | PVC | grafts alone | 0 | 43 | 16 | 290 |
| 17 B₃ | PVC | grafts alone | 0 | 25 | 9 | 467 |
| 17C | Polyether ester | backbones alone | 100 | 28 | 15 | 480 |

S—Suspension polymerization process
B—Bulk polymerization process
BS—Breaking stress
EB—Elongation at break While the invention has been described in connection with a preferred embodiment, it is not intended to limit the scope of the invention to the particular form set forth, but on the contrary, it is intended to cover such alternatives, modifications, and equivalents as may be included within the spirit and scope of the invention as defined by the appended claims.

What is claimed is:

1. A grafted block copolymer which is a thermoplastic elastomer consisting essentially of a backbone and grafts of a polymerized monomer bonded thereto, wherein the backbone is a polyetheresteramide block copolymer and wherein said monomer is a member selected from the group consisting of vinyl chloride, vinylidene chloride, clorotrifluoroethylene, alkyl (meth)acrylates, styrene, α-methylstyrene, vinyl acetate, and mixtures thereof.

2. The grafted block copolymer of claim 1 wherein the monomer consists of vinyl chloride, vinylidene chloride, vinyl acetate, or mixtures thereof.

3. The grafted block copolymer of claim 1 wherein the monomer consists of methyl methacrylate, ethyl methacrylate, or mixtures thereof.

4. The grafted block copolymer of claim 1 wherein the monomer consists of styrene, α-methylstyrene, or mixtures thereof.

5. The grafted block copolymer of claim 1, wherein the monomer consists of butyl acrylate, 2-ethylhexyl acrylate, or mixtures thereof.

6. The grafted block copolymer of claim 1, wherein the monomer consists of chlorotrifluoroethylene.

7. A molded object consisting essentially of a grafted block copolymer of claim 1.

8. A grafted block copolymer which is a thermoplastic elastomer consisting essentially of a backbone and grafts of a polymerized monomer bonded thereto, wherein the backbone comprises sequentially distributed flexible blocks of a polyether and rigid blocks selected from a polyamide, a polyester, or mixtures thereof and wherein said monomer is clorotrifluoroethylene.

\* \* \* \* \*